(12) United States Patent
Pugh, Jr. et al.

(10) Patent No.: US 8,396,319 B2
(45) Date of Patent: Mar. 12, 2013

(54) SEPARATION AND CONTRAST ENHANCEMENT OF OVERLAPPING CAST SHADOW COMPONENTS AND TARGET DETECTION IN SHADOW USING POLARIZATION

(75) Inventors: Edward N. Pugh, Jr., Philadelphia, PA (US); Nader Engheta, Berwyn, PA (US); Shih-Schon Lin, San Francisco, CA (US); Konstantin Yemelyanov, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 889 days.

(21) Appl. No.: 12/373,969

(22) PCT Filed: Jul. 17, 2007

(86) PCT No.: PCT/US2007/016247
§ 371 (c)(1),
(2), (4) Date: May 19, 2009

(87) PCT Pub. No.: WO2008/011050
PCT Pub. Date: Jan. 24, 2008

(65) Prior Publication Data
US 2010/0013965 A1  Jan. 21, 2010

Related U.S. Application Data

(60) Provisional application No. 60/831,798, filed on Jul. 18, 2006.

(51) Int. Cl.
*G06K 9/40* (2006.01)
*H04N 5/202* (2006.01)
(52) U.S. Cl. .................... 382/274; 348/254; 348/E5.074
(58) Field of Classification Search ........................ None
See application file for complete search history.

(56) References Cited

U.S. PATENT DOCUMENTS

| | | | |
|---|---|---|---|
| 3,641,268 A | 2/1972 | Beck | |
| 6,353,673 B1 * | 3/2002 | Shnitser et al. | 382/103 |
| 6,985,616 B2 * | 1/2006 | Ganz et al. | 382/133 |
| 7,003,149 B2 * | 2/2006 | Benesch et al. | 382/145 |
| 7,492,927 B2 * | 2/2009 | Marschner et al. | 382/118 |
| 2003/0012414 A1 | 1/2003 | Luo | |
| 2005/0025357 A1 * | 2/2005 | Landwehr et al. | 382/170 |
| 2005/0185847 A1 * | 8/2005 | Rowe | 382/224 |

OTHER PUBLICATIONS

Bio-Inspired Sensing and Display of Polarization Imagery, Submitted to Air Force Office of Scientific Research, Jul. 17, 2005, Pugh et al., Engheta http://www.dtic.mil/cgi-bin/GetTRDoc?Location=U2&doc=GetTRDoc.pdf&AD=ADA435868.*
Storming Media citation of Bio-Inspired Sensing and Display of Polarization Imagery: http://www.stormingmedia.us/86/8685/A868534.html.*

(Continued)

*Primary Examiner* — Michelle Entezari
(74) *Attorney, Agent, or Firm* — Woodcock Washburn, LLP

(57) ABSTRACT

Shadow is an inseparable aspect of all natural scenes. When there are multiple light sources or multiple reflections several different shadows may overlap at the same location and create complicated patterns. Shadows are a potentially good source of information about a scene if the shadow regions can be properly identified and segmented. However, shadow region identification and segmentation is a difficult task and improperly identified shadows often interfere with machine vision tasks like object recognition and tracking. A shadow separation and contrast enhancement method based on the polarization of light is provided. Polarization information of scenes is captured by a polarization-sensitive camera and the scenes are processed to effectively separate shadows from different light sources.

21 Claims, 9 Drawing Sheets

OTHER PUBLICATIONS

Cucchiara, R. et al., "Detecting Moving Objects, Ghosts, and Shadows in Video Streams," IEEE Trans. Pattern Anal. Mach. Intell., 2003, 25, 1337-1342.
Duggin, M.J., "Imaging polarimetry in scene element discrimination," in Proc. SPIE, Polarization: Measurement, Analysis, and Remote Sensing II (SPIE1999), 3754, pp. 108-117.
Egan, W.G. et al., "Dark-target retroreflection increase," Proc. SPIE, Polarization: Measurement, Analysis, and Remote Sensing II (SPIE1999), 3754, pp. 218-225.
Finlayson, G. et al., "Removing shadows from images," in ECCV (2002), pp. 823-836.
Frisch, K., "Die polarization des himmelsslichtes als orientierender factor bei den tanzen der bienen," Experientia, 1949, 5, 142-148.
Funka-Lea, G. et al., "Combining color and geometry for the active visual recognition of shadows,", in Proc. Int. Conf. on Computer Vision, 1995, 203-209.
Gershon, R. et al., "Ambient illumination and the determination of material changes," J. Opt. Soc. Am. A, 1986, 3, 1700-1707.
Gevers, T. et al., "Classifying color edges in video into shadow-geometry, highlight, or material transitions," IEEE Trans. Multimedia, 2003, 5, 237-243.
Goldstein, D.H. et al., "Polarimetric characterization of Spectralon," in Proc. SPIE, Polarization: Measurement, Analysis, and Remote Sensing II (SPIE1999), 3754, pp. 126-136.
Horvath, G., "Reflection polarization patterns at flat water surfaces and their relevance for insect polarization vision," J. Theor. Biol., 1995, 175, 27-37.
Irvin, R. et al., "Methods for exploiting the relationship between buildings and their shadows in aerial imagery," IEEE Trans. Syst. Man. Cybern., 1989, 19, 1564-1575.
Jiang, C. et al., "Shadow segmentation and classification in a constrained environment," CVGIP: Image Understanding, 1994, 59, 213-225.
Koller, D. et al., "Model-based object tracking in monocular image sequences of road traffic scenes," Int. J. Comput. Vision, 1993., 10, 257-281.
Lin, S.-S. et al., "Polarization-based and specular-reflection-based noncontact latent fingerprint imaging and lifting," J. Opt. Soc. Am. A, Sep. 2006, 23(9), 2137-2153.
Lin, S.-S. et al., "Separation and contrast enhancement of overlapping cast shadow components using polarization," Opt. Express, 2006, 14, 7099-7108.
Liow, Y. et al., "Use of shadows for extracting buildings in aerial images," Comp. Vision Graph. Image Process, 1999, 49(2), 242-277.
Marchant, J.A. et al., Shadow-invariant classification for scenes illuminated by daylight, J. Opt. Soc. Am. A, 2000, 17, 1952-1961.
Nadimi, S. et al., "Physical Models for Moving Shadow and Object Detection in Video," IEEE Trans. Pattern Anal. Mach. Intell., 2004, 26, 1079-1087.
Nagao, M. et al., "Region extraction and shape analysis in aerial photographs," Comp. Vision Graph. Image Process., 1979, 10, 195-223.
Pentland, A.P., "Finding the illuminant direction," J. Opt. Soc. Am., 1982, 72, 448-455.
Pinel, J. et al., "Estimation 2d illuminant direction and shadow segmentation in natural video sequences," in Proc. VLBV, 2001, 197-202.
Powell, M.W. et al., "A simple strategy for calibrating the geometry of light sources," IEEE Trans. Pattern Anal. Mach. Intell., 2001, 23, 1022-1027.
Prati, A. et al., Detecting Moving Shadows: Algorithms and Evaluation, IEEE Trans. Pattern Anal. Mach. Intell., 2003, 25, 918-923.
Rowe, M.P. et al., "Polarization-difference imaging: a biologically inspired technique for observation through scattering media," Opt. Lett., 1995, 20, 608-610.
Salvador, E. et al., "Cast shadow segmentation using invariant color features," Comp. Vision Image Understand., 2004, 95, 238-259.
Sato, I. et al., "Illumination from Shadows." IEEE Trans. Pattern Anal. Mach. Intell., 2003, 25, 290-300.
Scanlan, J.M. et al., A Shadow Detection and Removal Algorithm for 2D Images, in Proc. of Int. Conf. on Acoustics, Speech, and Signal Processing, 1990, 2057-2060.
Schwind, R., "Zonation of the optical environment and zonation in the rhabdom structure within the eye of the backswimmer, *Notenecta glauca*," Cell and Tissue Research, 1983, 232, 53-63.
Shih-Schon Lin et al., "Polarization enhanced visual surveillance techniques," Networking Sensing and Control, 2004 IEEE International Conference, vol. 1, Mar. 21-23, 2004, 216-221.
Stauder, J. et al., "Detection of moving cast shadows for object segmentation," IEEE Trans. Multimedia 1, 1999, 65-77.
Tyo, J.S. et al., "Colorimetric representation for use with polarization-difference imaging of objects in scattering media," J. Opt. Soc. Am. A 15, 1998, 367-374.
Tyo, J.S. et al., "Target detection in optically scatter media by polarization-difference imaging," Appl. Opt., 1996, 35, 1855-1870.
Wang, C et al., "Detecting clouds and cloud shadows on aerial photographs," Pattern Recogn. Lett., 1991, 12, 55-64.
Wang, J.M. et al., "Shadow Detection and Removal for Traffic Images," in Proc. 2004 IEEE Int. Conf. on Networking, Sensing and Control (IEEE Syst. Man. Cybern. Society, Taipei, Taiwan, 2004) pp. 649-654.
Wehner, R., "Polarized-light navigation by insects," Scientific American, 1976, 235, 106-114.
Yemelyanov, K.M. et al., "Adaptive Algorithms for two-channel Polarization Sensing under Various Polarization Statistics with Non-Uniform Distributions," Appl. Opt., 2006, 45, 5504-5520.
Yemelyanov, M.A. et al., "Bio-inspired display of polarization information using selected visual cues," in Proc. SPIE, J.A. Shaw and J.S. Tyo eds. (SPIE2003), 5158, pp. 71-84.
Yemelyanov, M.A. et al., "Display of polarization information by coherently moving dots," Opt. Exprss, 2003, 11, 1577-1584.
Zhang, Y. et al., "Illuminant direction determination for multiple light sources," in Proc. IEEE CVPR, 2000, 269-276.

* cited by examiner

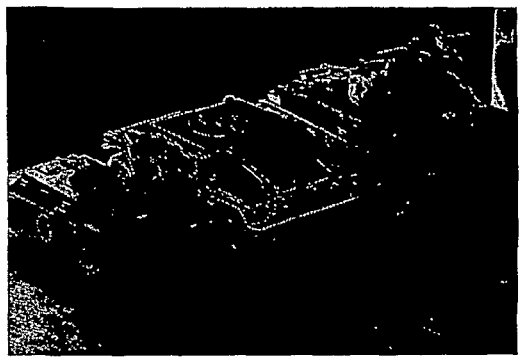
Fig. 13
Fig. 14
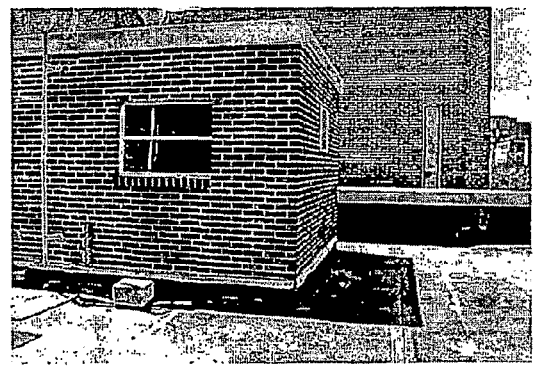
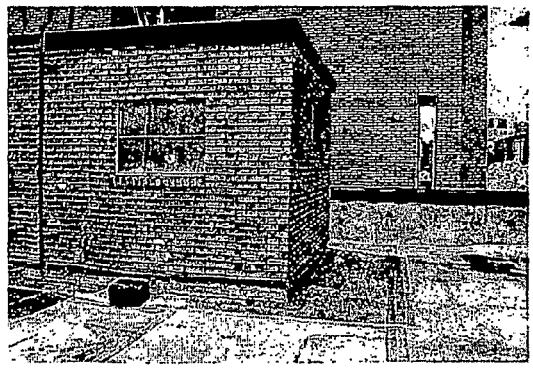
Fig. 15

SEPARATION AND CONTRAST
ENHANCEMENT OF OVERLAPPING CAST
SHADOW COMPONENTS AND TARGET
DETECTION IN SHADOW USING
POLARIZATION

CROSS-REFERENCE TO RELATED
APPLICATIONS

This application is the National Stage of International Application No. PCT/US2007/016247 filed Jul. 17, 2007, which claims the benefit of U.S. Provisional Application No. 60/831,798, filed Jul. 18, 2006, and the entire disclosure of each application is incorporated by reference herein.

FIELD OF THE INVENTION

The present application relates to image processing and, more particularly, to techniques for separating and enhancing the contrast of overlapping cast shadow components within images and for detection and identification of objects hidden in shadows using polarization imaging by solving for the image intensity, degree of polarization, and polarization orientation angle of the resultant polarization images.

BACKGROUND OF THE INVENTION

Shadows are formed whenever an occlusion partially blocks the illumination of a surface or object by a light source. With the exception of the ambient light, which is assumed to be omni-directional, light sources illuminate surfaces from only one specific direction. In addition to classification by the source direction, shadows are further classified into "self" and "cast". A "self" shadow refers to the regions of an object not directly illuminated by a light source due to its surface orientation, whereas a "cast" shadow refers to a region not illuminated by a source due to occlusion by other objects. Shadowed regions usually appear darker than the lit regions and their color properties (e.g., hue and saturation) can also appear different than the directly illuminated regions. Such differences in intensity and color create patterns and boundaries/edges that often confuse human observers or machine vision algorithms that attempt to segment scenes and identify objects using these cues. For this reason, many techniques have been developed to identify, segment, and remove shadows from an image or a video sequence. However, all previously published methods use only two aspects of light—its intensity and/or spectral ("color") distribution—as information in shadow segmentation. However, in some cases these are combined with available temporal and geometric information. It appears that a third fundamental property of light—its polarization—has not heretofore been used for the purpose of shadow segmentation. Furthermore, most existing shadow segmentation algorithms assume a relatively simple shadow model: an area of a scene is classified either as shadow or non-shadow. In fact, it is possible for a specific region of a scene to be both shadow for one source and illuminated simultaneously by another source or sources, as explained below. In such cases, polarization information can assist in "parsing" such complications in scene segmentation.

Polarization is an intrinsic property of light. Light from the dominant natural source, the sun, is not polarized, but light scattered from small particles in the sky and most light reflected or scattered from object surfaces is partially polarized. The unaided human eye and most machine vision cameras are "blind" to polarization, but some animal species can detect and utilize polarization information and use it for a variety of purposes, including navigation and object recognition. Inspired by biological polarization vision, the present inventors have previously developed polarization sensitive cameras and processing methods for the detection of targets in scattering media, detecting latent fingerprints and enhancing surveillance. (See M. P. Rowe, E. N. Jr. Pugh, and N. Engheta, "Polarization-difference imaging: a biologically inspired technique for observation through scattering media," Opt. Lett. 20, 608-610 (1995); J. S. Tyo, M. P. Rowe, E. N. Jr. Pugh, and N. Engheta, "Target detection in optically scatter media by polarization-difference imaging," Appl. Opt. 35, 1855-1870 (1996); S.-S. Lin, K. M. Yemelyanov, E. N. Jr. Pugh, and N. Engheta, "Polarization Enhanced Visual Surveillance Techniques," in Proc. of IEEE Int. Conf. on Networking, Sensing and Control (IEEE Syst. Man. Cybern. Society, Taipei, Taiwan, 2004). The inventors have also previously developed methods for displaying polarization information effectively to human observers. (See J. S. Tyo, E. N. Jr. Pugh, and N. Engheta, "Colorimetric representation for use with polarization-difference imaging of objects in scattering media," J. Opt. Soc. Am. A 15, 367-374 (1998); K. M. Yemelyanov, M. A. Lo, E. N. Jr. Pugh, and N. Engheta, "Display of polarization information by coherently moving dots," Opt. Express 11, 1577-1584 (2003).) It has been reported that polarization increases in dark surface area (W. G. Egan, "Dark-target retroreflection increase," in Proc. SPIE, Polarization: Measurement, Analysis, and Remote Sensing 11 (SPIE1999), 3754, pp. 218-225), and that polarization can be used to enhance details in shadow (M. J. Duggin, "Imaging polarimetry in scene element discrimination," in Proc. SPIE, Polarization: Measurement, Analysis, and Remote Sensing II (SPIE1999), 3754, pp. 108-117). It has also been reported that polarization increases with increasing incident light angle (D. H. Goldstein, D. B. Chenault, and J. L. Pezzaniti, "Polarimetric characterization of Spectralon," in Proc. SPIE, Polarization: Measurement, Analysis, and Remote Sensing II (SPIE1999), 3754, pp. 126-136).

However, complex overlapping cast shadows remain almost impossible to distinguish in images generated with only intensity and color information. A technique is desired that allows such complex overlapping cast shadows to be readily segmented from each other in images generated from the polarization parameters of a scene. The present invention addresses this need in the art.

SUMMARY OF THE INVENTION

The present invention addresses the above-mentioned needs in the art by providing a method of improving contrast within shadows of an imaged scene by obtaining images of the scene from at least 3 different angles of orientation $\phi$ of a polarization analyzer attached to a regular CCD camera or any other polarization sensitive camera, calculating a measured intensity I at a specific image location or pixel as a function of the angle of orientation $\phi$, recovering $I_U$, $I_A$, and $\theta$ for each pixel of the obtained images to provide $I_U$, $I_A$, and $\theta$ images, where $I_U$ is the 50% of the total intensity at each pixel in the scene $((I_{max}+I_{min})/2)$, $I_A$ is 50% of the intensity difference between the maximum and minimum measured intensities of the polarized light $((I_{max}-I_{min})/2)$ from each pixel as a function of the angle of orientation $\phi$ of the analyzer, and $\theta$ is the orientation angle of the major axis of the polarization ellipse, and outputting the $I_U$, $I_A$, and $\theta$ images. If $I_U$ is non-zero, a p image may also be recovered and displayed, where $p \equiv I_A/I_U$ defines the degree of linear polarization at the pixel.

In an exemplary embodiment, the measured intensity I at a specific image location or pixel is calculated as a function of the angle of orientation φ of the one or more polarization sensitive cameras in accordance with the equation:

$$I(\phi)=I_U+I_A \cos[2(\theta-\phi)]=I_U\{1+p\cos[2(\theta-\phi)]\},$$

where $p \equiv I_A/I_U$. The reference axis for the angles φ and θ may be arbitrarily chosen. Also, contrast enhancement to at least one of the $I_U$, $I_A$, and θ images may be provided. For example, the contrast enhancement may be provided by a linear stretch algorithm.

In the case where φ=0, 45 and 90 degrees for the 3 different angles, respectively, the processing is simplified. In such a case, $I_U$, $I_A$, and θ may be recovered for each pixel of the image in accordance with the equations:

$$I_U=(I_0+I_{90})/2$$

$$I_A=\sqrt{(I_{45}-I_U)^2+(I_{90}-I_U)^2}$$

$$\theta=\arctan[(I_{45}-I_U)/(I_{90}-I_U)]/2.$$

$$p=I_A/I_U$$

where indices 0, 45, and 90 indicate the orientation of a polarizer in front of the camera in degrees, relative to an appropriate reference angle, when each specific image was taken.

The invention also includes a system for implementing such a method of improving contrast within shadows of an imaged scene. In accordance with the invention, such a system includes one or more polarization sensitive cameras that obtains images of the scene from at least 3 different angles of orientation φ, a processor programmed to calculate a measured intensity I at a specific image location or pixel as a function of the angle of orientation φ and to recover $I_U$, $I_A$, p, and θ for each pixel of the obtained images to provide $I_U$, $I_A$, p, and θ images, and an output device that displays the $I_U$, $I_A$, p, and θ images. In an exemplary embodiment, the polarization sensitivity is conferred by a polarization analyzer. The image processing of the method of the invention is provided by computer software that programs the processor to perform the calculations and to implement the image enhancement algorithms provided in accordance with the techniques of the invention.

BRIEF DESCRIPTION OF THE DRAWINGS

FIGS. 10-16 illustrate additional pictures taken using the apparatus of the invention where the left column shows the "intensity-only" images (equivalent to conventional images), while the right column shows some form of polarization information (e.g., degree of linear polarization) of each pixel taken using the techniques of the invention.

DETAILED DESCRIPTION OF ILLUSTRATIVE EMBODIMENTS

Figure 1:
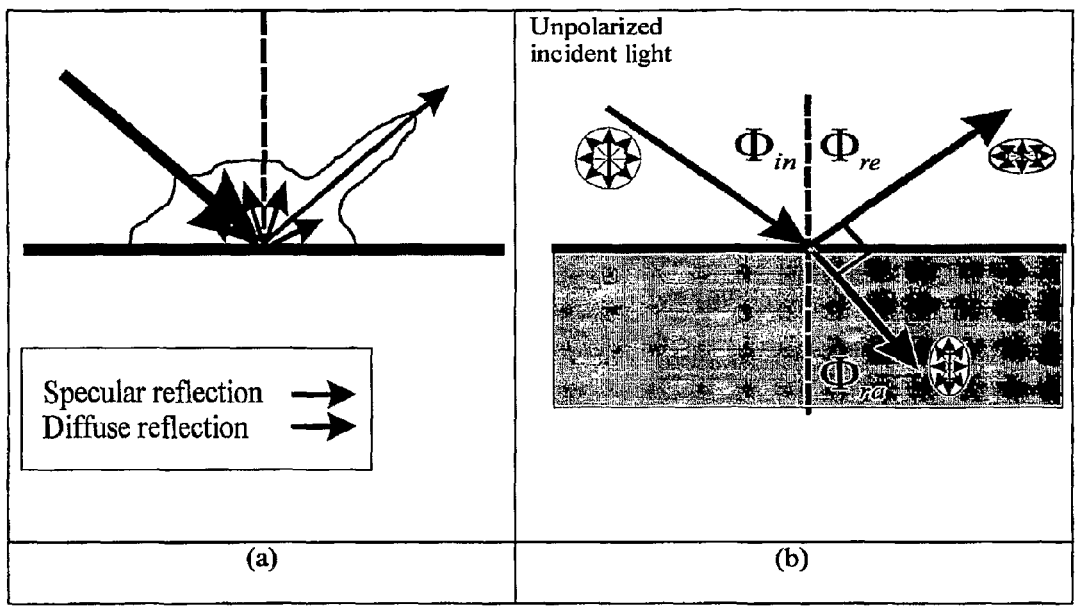
FIG. 1(a) illustrates the general macroscopic reflection model.
FIG. 1(b) illustrates the polarization of light resulting from specular reflection from a dielectric surface.

The invention will be described in detail below with reference to FIGS. 1-16. Those skilled in the art will appreciate that the description given herein with respect to those figures is for exemplary purposes only and is not intended in any way to limit the scope of the invention. All questions regarding the scope of the invention may be resolved by referring to the appended claims.

According to the generally accepted macroscopic description of the interaction of light with a surface, reflected light can be subdivided into specular and diffuse components. FIG. 1(a) illustrates the general macroscopic reflection model, while FIG. 1(b) illustrates the polarization of light resulting from specular reflection from a dielectric surface. The ratio of energy carried by the diffuse and specular components depends on the angle of incidence and the material properties of the surface. The diffusely reflected components often undergo multiple random reflections microscopically, so statistically they tend to be unpolarized. In contrast, the specularly reflected component is usually at least partially polarized, with the polarization direction (dominant axis of E-field oscillation) parallel to the local tangent plane of the surface as shown in FIG. 1(b). These physical phenomena can be formalized through appropriate application of Fresnel's analysis and equations.

In addition to the scattering by surfaces, another important natural source of polarization is the scattering of light by the atmosphere of the earth. The polarization of sun light by the air particles can be explained by the theory of Rayleigh scattering, which describes the particles as electric dipoles: because oscillating dipoles do not radiate in the direction of oscillation, a polarization-sensitive observer will see the dome of the sky to exhibit a polarization pattern that depends on the location of the sun. Since pioneering investigations of von Frisch, it has been well established that many insects can avail themselves of this polarization for navigation. Such polarization has consequences for the segmentation of shadows. As will be shown below, an area that is inside a shadow cast by direct sunlight, but which is lit by the polarized ambient sky light, will show a distinctive polarization, whereas an area that is inside both the shadow cast by sunlight and the shadow cast by skylight will show no polarization at all.

Because most imaging devices integrate light energy over a time epoch that is long relative to the oscillation period (fs), phase information is not recorded. With the phase information lost, when a linear polarization analyzer is placed in front of the camera, the measured intensity I at a specific image location or pixel, as a function of the angle of orientation $\phi$ of the polarization analyzer is given by $$I(\phi)=I_U+I_A \cos[2(\theta-\phi)]=I_U\{1+p\cos[2(\theta-\phi)]\}, \quad (1)$$

where $\theta$ is the orientation angle of the major axis of the polarization ellipse, $I_U$ is 50% of the total intensity at each pixel $((I_{max}+I_{min})/2)$, $I_A$ is 50% of the intensity difference between the maximum and minimum measured intensities of the polarized light $((I_{max}-I_{min})/2)$ from each pixel as a function of the angle of orientation $\phi$ of the analyzer, and $p \equiv I_A/I_U$ defines the degree of linear polarization at the pixel. The reference axis for the two angles $\phi$ and $\theta$ can be arbitrarily chosen, and complete information about the polarization state of the light can be obtained by capturing images with the polarizer oriented at three different angles, for example $\phi=0$, 45 and 90 degrees (See, for example, S.-S. Lin, K. M. Yemelyanov, E. N. Jr. Pugh, and N. Engheta, "Polarization Enhanced Visual Surveillance Techniques," in Proc. of IEEE Int. Conf. on Networking, Sensing and Control (IEEE Syst. Man. Cybern. Society, Taipei, Taiwan, 2004), and K. M. Yemelyanov, S.-S. Lin, W. Q. Luis, E. N. Jr. Pugh, and N. Engheta, "Bio-inspired display of polarization information using selected visual cues," in Proc. SPIE, J. A. Shaw and J. S. Tyo eds. (SPIE2003), 5158, pp. 71-84.) From these three images, one can recover $I_U$, $I_A$, and $\theta$ for each pixel of the image using the following expressions:

$$I_U=(I_0+I_{90})/2$$

$$I_A=\sqrt{(I_{45}-I_U)^2+(I_{90}-I_U)^2}$$

$$\theta=\arctan[(I_{45}-I_U)/(I_{90}-I_U)]/2.$$

$$p \equiv I_A/I_U \quad (2)$$

Here indices 0, 45, and 90 indicate the orientation of the polarizer in degrees when each specific image was taken. Because $\theta$ and $\theta+\pi$ directions are indistinguishable for phase-blind sensors, the meaningful range of $\theta$ is restricted to $\pi$, and $\theta$ ranges from 0 to $\pi$.

Exemplary Apparatus

In the examples presented below, three angles (0, 45 and 90) are sampled by manually or mechanically rotating a single linear polarizer mounted in front of an intensity integrating camera. The camera used in the exemplary embodiments is a calibrated Olympus E-10 digital camera with a 4 Mega pixels CCD sensor and 10 bit pixel depth (used in the RAW mode). Such a camera system is used as it is capable of capturing polarized images at 3 different angles of polarization at the same time or nearly the same time in quick succession. Such a camera system can be realized typically in one of the following ways.

Figure 2:
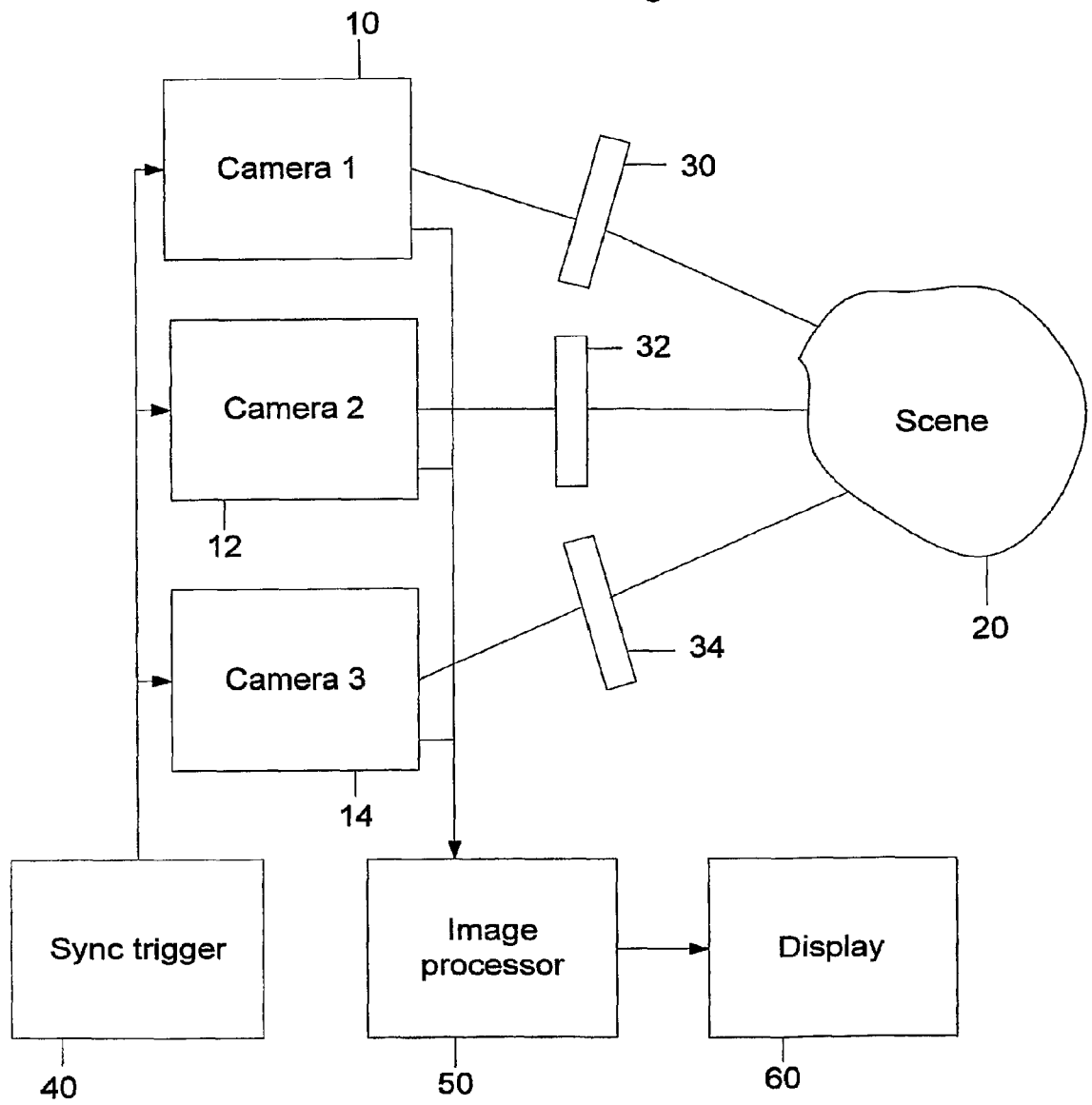
FIG. 2 illustrates a first exemplary embodiment of a camera configuration in accordance with the invention.

In a first embodiment, 3 cameras are used as shown in FIG. 2. The cameras 10, 12, and 14 are preferably identical or calibrated to be practically identical (which means that if used to take a picture of the same scene under the same lighting conditions, every pixel in the picture taken by every camera would be the same). The 3 cameras 10, 12, 14 are set up to be looking at the same scene 20 and a polarizer 30, 32, 34 is placed in the light path of each of the respective cameras so that the 3 cameras 10, 12, 14 each record only the light energy that is polarized in one particular angle. Typically, the 3 angles 0, 45, and 90 degrees are chosen due to ease of formulation and computation as presented in the equations above. A synchronization device 40, either mechanical or electronic, is used to trigger the 3 cameras 10, 12, 14 to take a picture of the same scene 20 either simultaneously or nearly simultaneously in quick succession (quick enough so that the 3 cameras are recording the same scene under the same lighting, i.e. faster than the rate of change of the scene and lighting conditions). For a far away scene, the 3 cameras can be simply placed parallel or bore sighted to a specific view distance. For a close up scene, polarizing and non-polarizing beam splitters (not shown) can be used to align the 3 cameras at the same line of sight. As will be explained below, the outputs of the respective cameras are processed using image processing algorithms running on processor 50 for output to display 60.

Figure 3:
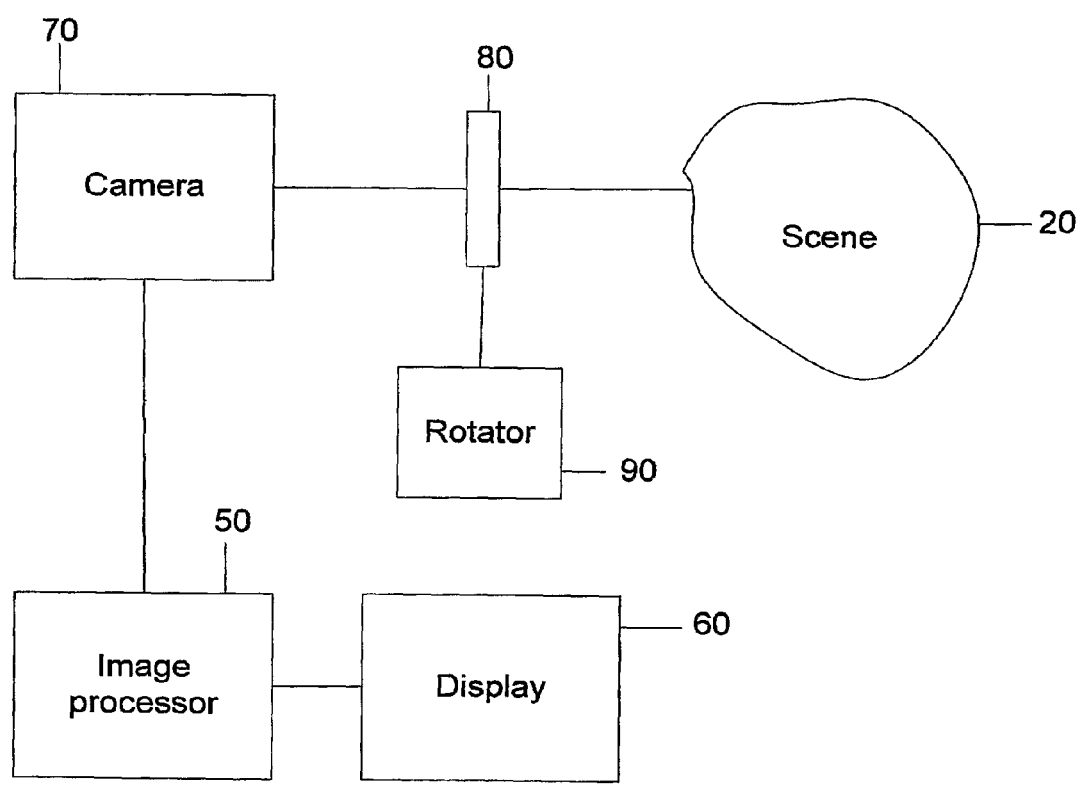
FIG. 3 illustrates a second exemplary embodiment of a camera configuration in accordance with the invention.

In a second embodiment, only 1 camera 70 may be used as illustrated in FIG. 3. In such case, a linear polarizer 80 is placed in the light path of the camera 70. A rotator mechanism 90 is provided to change/rotate the angle of linear polarizer 80 so 3 polarization angle images can be recorded in sequence. There are several ways to change the angle of linear polarization using linear polarizer 80. For example, a single polarizer filter that can be rotated may be used, or a filter wheel may be used that can change 3 polarizer filters installed so as to be at different angles. Liquid crystal technology also may be used to change polarization of the liquid crystal filter by applying a different voltage.

The method of the invention only requires capturing images of the same scene at 3 different angles of polarization under the same lighting conditions, and is not limited to any specific implementation to achieve this requirement. Three such images allow one to solve Equations (2) above for the three simultaneous variables $I_U$, $I_A$, p, and $\theta$.

Image Processing

Figure 4:
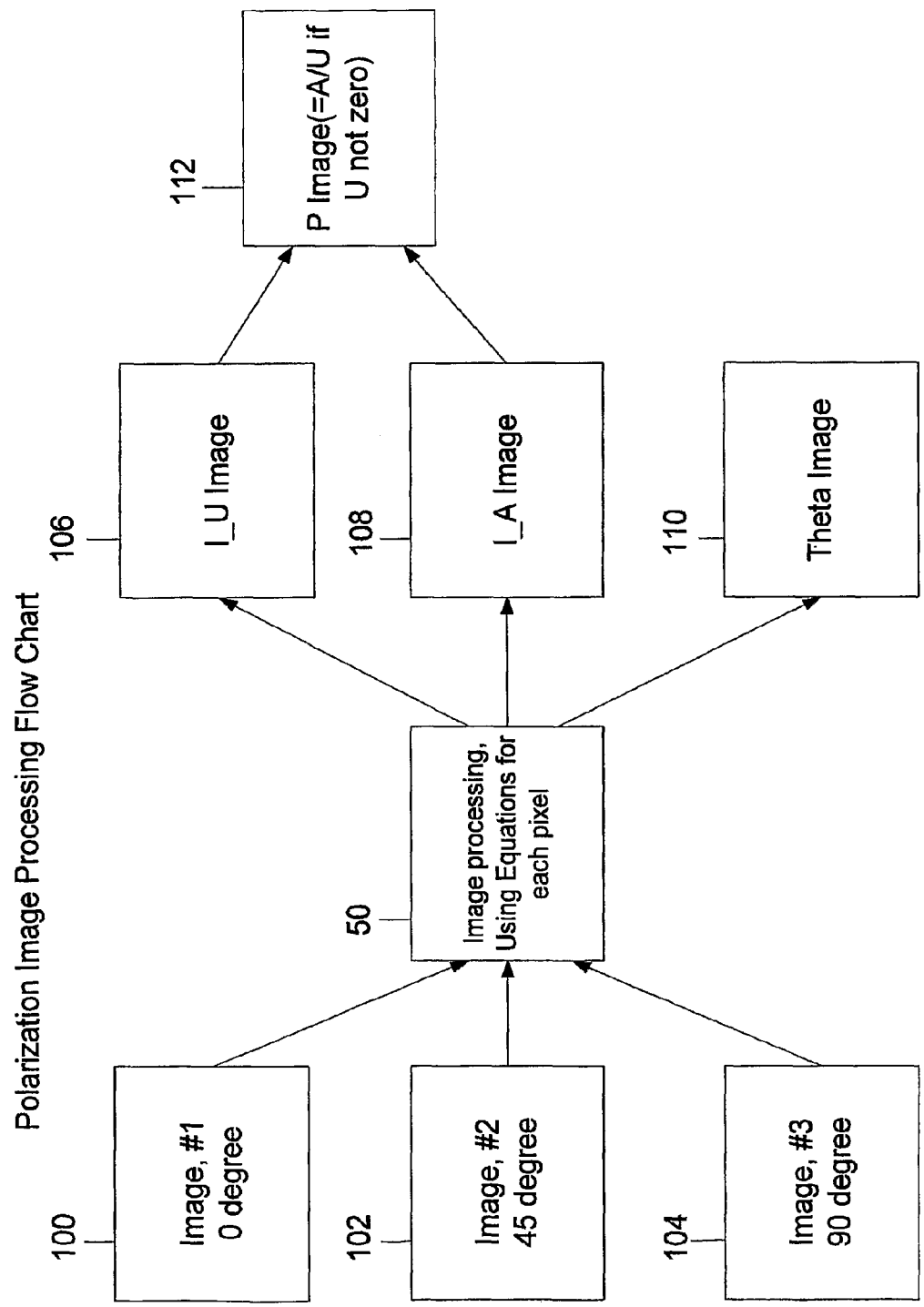
FIG. 4 illustrates a simplified image processing algorithm in accordance with the invention.

A simplified image processing algorithm in accordance with the invention is shown in FIG. 4. As illustrated, once the images of the scene at 3 different angles are taken at 100, 102, 104, the image is processed by image processor 50 as follows. The measured intensity I at a specific image location or pixel, as a function of the angle of orientation $\phi$ of the polarization analyzer is given by Equation (1) above where $\theta$ is the orientation angle of the major axis of the polarization ellipse, $I_U$ is 50% of the total intensity at each pixel, $I_A$ is 50% of the intensity difference between the maximum and minimum measured intensities of the polarized light $((I_{max}-I_{min})/2)$ from each pixel as a function of the angle of orientation $\phi$ of the analyzer, and $p \equiv I_A/I_U$ defines the degree of linear polarization at the pixel. The reference axis for the two angles $\phi$ and $\theta$ can be arbitrarily chosen, and information about the polarization state of the natural light (which is usually polychromatic and partially polarized) can be obtained by capturing images with the polarizer oriented at three different angles, for example $\phi=0$, 45 and 90 degrees, as described above. From these three images, one can recover $I_U$, $I_A$, p, and $\theta$ for each pixel of the image using the expressions of Equations (2) above to provide $I_U$, $I_A$, and $\theta$ images 106, 108, 110 as shown in FIG. 4. If $I_U$ is non-zero, a p image 112 may also be calculated at 34 as $p \equiv I_A/I_U$. In this case, indices 0, 45, and 90 indicate the orientation of the polarizer in degrees when each specific image was taken. Because $\theta$ and $\theta+\pi$ directions are indistinguishable for phase-blind sensors, the meaningful range of $\theta$ is restricted to $\pi$, and $\theta$ ranges from 0 to $\pi$.

Thus, the step by step processing by image processor 50 includes the followings steps:

Step 1: digitize the 3 images if the cameras are not digital.
Step 2: load the 3 images into computer memory using a suitable computer program.

Step 3: for each corresponding pixel of the image from 3 different polarization angles, compute the $I_U$, $I_A$, θ and p values using Equations (2) above.

Step 4: output 3 images $I_U$, $I_A$, p, and θ. These are images having the same number of pixels as the original 3 pictures but the corresponding pixels are the values of $I_U$, $I_A$, θ and p. The polarization information may then be displayed or stored and used as input to another algorithm and/or processor for higher level processing and analysis to further interpret the data. For example, the image may be segmented or the image may be analyzed for target detection or target recognition. In such applications, the image data alone may be used or the image data may be used as part of an array of sensor data for processing.

The shadow detection/enhancement is found in the $I_A$, θ or p images. Sometimes a simple linear stretch or other common contrast enhancement is needed in order to better see the shadow detection/enhancement. However, without using the polarization setup, all other common contrast enhancement methods applied on a picture taken by a regular camera will not show the shadow details.

Image Examples

Figure 5:
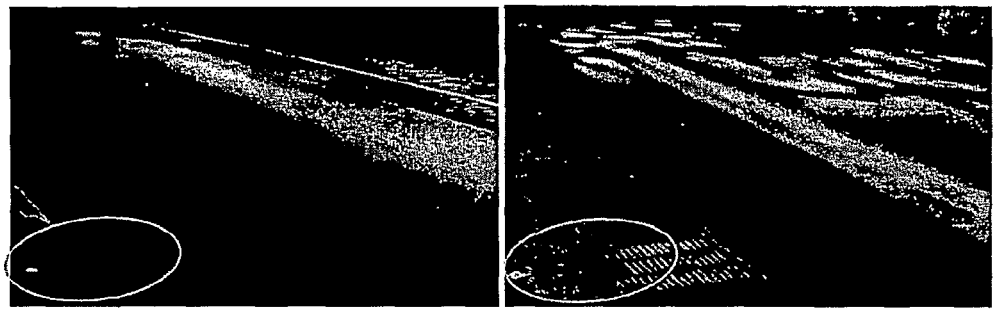
FIG. 5 (left side) illustrates a conventional "intensity-only" image of an outdoor scene with light and shadow, while FIG. 5 (right side) illustrates a "degree-of-polarization" image of the same scene.
Figure 6:
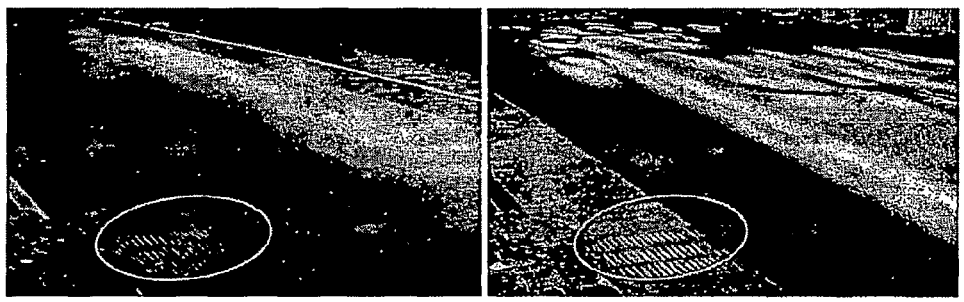
FIG. 6 illustrates the images of FIG. 5 after a linear contrast enhancement (linear intensity range stretch) was performed, followed by gamma correction of 0.5 to both images of FIG. 5.
Figure 7:
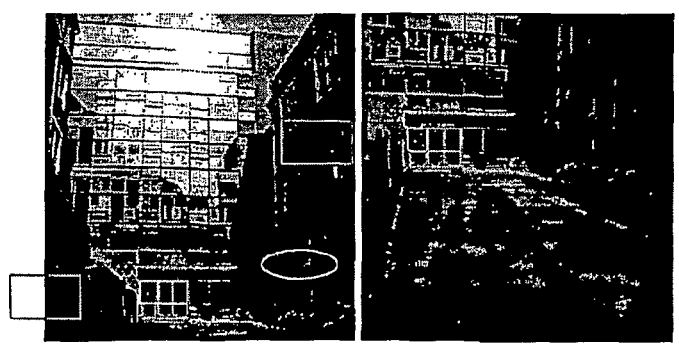
FIG. 7 illustrates images of the glass-wall and frames of the building of FIGS. 5 and 6 (FIG. 7, left side) and of the walkway when the bright direct sunlight is blocked (FIG. 7, right side) so as to further document the nature of the sunlight and glass wall sources to the shadows revealed by polarization analysis.

The first example is an outdoor scene of a walkway in front of a building with all-glass walls (FIG. 5 to FIG. 7; the glass-walled building is visible in FIG. 7). To make it easier to grasp the relationship between pictures in FIGS. 5 to 7, a circle is overlaid over a sewer drainage cover that is visible in all pictures but FIG. 7 (left side) to call attention to the fact that this is the exact same object in all the pictures. The sun illuminated the scene from the right hand side of the picture: shadows cast by trees are seen along the walkway, most clearly in the upper portion of the image. Most existing shadow handling algorithms would simply segment the dark areas as shadows, reducing or eliminating the contrast in brightness caused by the shadow. However as the pictures illustrate, there is a more complicated overlapping shadow pattern hidden inside the scene that is not detectable from analysis of the intensity distribution.

FIG. 5 (left side) illustrates a conventional "intensity-only" image of an outdoor scene with light and shadow, while FIG. 5 (right side) illustrates a "degree-of-polarization" image of the same scene. This image plots the quantity $p=I_A/I_U$ calculated using Equations (2) extracted for each image pixel. Hidden patterns of shadows within shadows are clearly visible in high contrast.

In the scene of FIG. 5, the glass-wall building to the left rear side of the scene reflected sunlight from its glass panels, but not from the thinner frames around each piece of glass. The reflected light was partially polarized, and the reflection pattern cast on the scene overlapped with the shadow pattern cast by the direct sunlight. The light reflected by the glass was weaker than the direct sunlight, and the pattern it creates is essentially invisible in the "intensity-only" image at the left. However, when a polarization-sensitive camera was used to extract the "degree of polarization" image, the hidden pattern of overlapping shadow was revealed (FIG. 5, right side). The area that was lit neither by direct sunlight, nor by the reflected light from the glass, is both dark and unpolarized, and thus appears dark in both images. These are the cast pattern of the glass frames of the glass-wall building to the left of the picture. The areas that were not lit by direct sunlight—and thus appear as shadows in the intensity-only image—but which were illuminated by the partially polarized reflected light from the glass-wall building, exhibit strong polarization. The degree-of-polarization image normalizes the polarization signal with respect to the total intensity (Equation (2)), so these areas show up as a bright pattern in the degree-of-polarization-image (FIG. 5, right side).

To establish that this pattern shown in the right side of FIG. 5 is unique to the polarization analysis, and not hidden in the intensity-only image due to low contrast in the shadow area, a linear contrast enhancement (linear intensity range stretch) was performed, followed by gamma correction of 0.5 to both images of FIG. 5. The results are shown in FIG. 6 and show the details in the dark area. The left image is the intensity image and the right image is the degree of polarization image. It is clear that the pattern revealed in the polarization image is not present in the intensity image even after contrast enhancement. FIG. 6 makes it clear that the shadow patterns are only revealed in the degree-of-polarization image.

To further document the nature of the sunlight and glass wall sources to the shadows revealed by polarization analysis, images of the glass-wall and frames of the building were provided (FIG. 7, left side), and of the walkway when the bright direct sunlight is blocked (FIG. 7, right side). It is noted that pictures in FIG. 7 are taken with the camera at about the same position and general view direction as when the pictures in FIG. 5 and FIG. 6 Fig. were taken. The only difference is that in FIG. 7 the camera zooms out and points more upward in order to put the tall glass-walled building into view. The pictures shown in FIG. 7 are all regular intensity images with no polarization information. The left image illustrates the glass-wall building showing big glass rectangles and frames. The right image illustrates the same walkway as in FIGS. 5 and 6 taken another day when the direct sunlight is blocked due to nearby construction scaffolding. The shadow pattern cast on the walkway by the glass-wall and frames is visible. The yellow circle in the right picture points out the same sewer drain cover as seen in FIGS. 5 and 6.

In sum, the inventors conclude that the patterns revealed in the degree-of-polarization image are indeed caused by shadows created by, polarized light reflected from the glass source.

Figure 8:
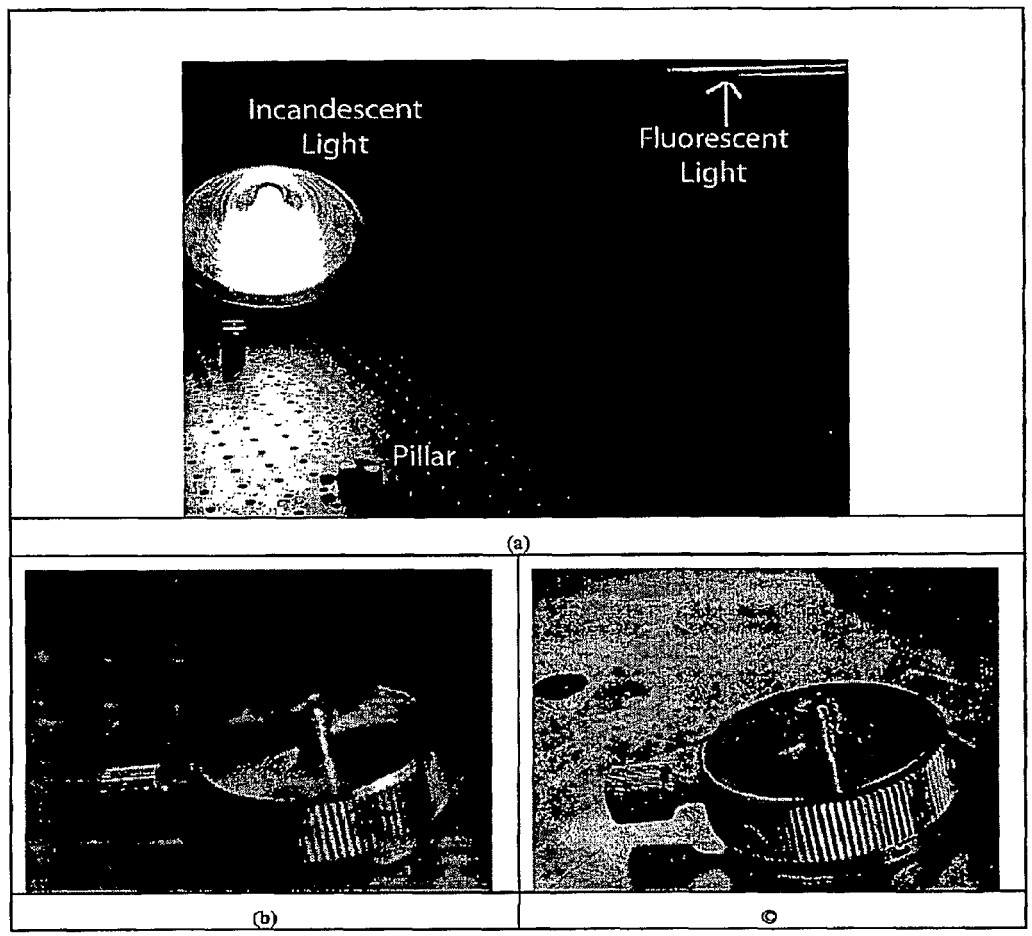
FIG. 8(a) illustrates an overview of the experimental setup where a metal pillar on an optical table is illuminated by a strong incandescent light from the side opposite to the camera, while another much weaker fluorescent light illuminates from the right hand side of the picture.
FIG. 8(b) shows the intensity-only image produced by the apparatus of FIG. 8(a).
FIG. 8(c) shows the degree-of-polarization image produced by the apparatus of FIG. 8(a).

The inventors also performed a controlled laboratory experiment to further confirm the results obtained outdoors. The setup comprised a 150 W incandescent light source illuminating a scene from the direction opposite the camera, and a 15 W fluorescent light illuminating the same scene from the direction corresponding to right hand side of the picture. An overview of the experimental setup is shown in FIG. 8(*a*). As shown, a metal pillar on an optical table is illuminated by a strong incandescent light from the side opposite to the camera, while another much weaker fluorescent light illuminates from the right hand side of the picture. The polarization of the observed reflection from the side illuminating fluorescent light is weaker because they are all diffusely scattered reflection, as opposed to the mostly Fresnel reflection coming from the incandescent light shining directly opposing the view of the camera. FIG. 8(*b*) shows the intensity-only image, while FIG. 8(*c*) shows the degree-of-polarization image. In the intensity-only image only the shadow of the knob cast by the dominant (incandescent) light source is visible. However, in the degree-of-polarization image, additional information is visible and separated clearly in high contrast. Specifically, a "shadow" cast by the much weaker fluorescent light from the right hand side is revealed as a bright area to the left of the metal pillar. The reason that this region appears bright in the degree-of-polarization image is due to the viewing geometry: the strong light reflected from the table is highly polarized, whereas the light reflected to the camera from the side source is only weakly polarized, and so where there is a shadow cast by the weaker source, the degree of polarization is less diluted by the weak unpolarized source and higher degree of polarization is detected. In addition, the area that is not illuminated by either source is very dark in the intensity-only image and is least polarized and seen as the darkest area in the degree-of-polarization image. Similarly, the polarization of the image regions corresponding to areas lit by both strong and weak light sources is lessened by the unpolarized light reflected to the camera from the weak source at the right hand side of the picture. Segmentation algorithms operating on the degree-of-polarization image can readily extract the distinctive "shadow" cast by the weak source.

Figure 9:
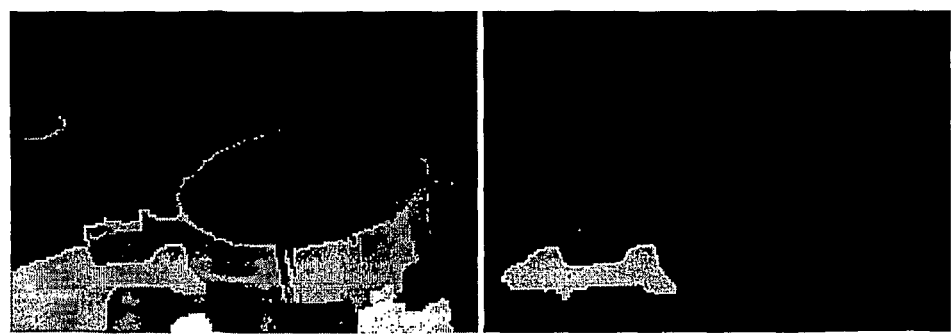
FIG. 9 illustrates a sample analysis (left side) showing segmentation results from region-growing analysis whereby the side shadow area is cleanly separated from the image when 21 or more regions are segmented (right side).
Figure 10:
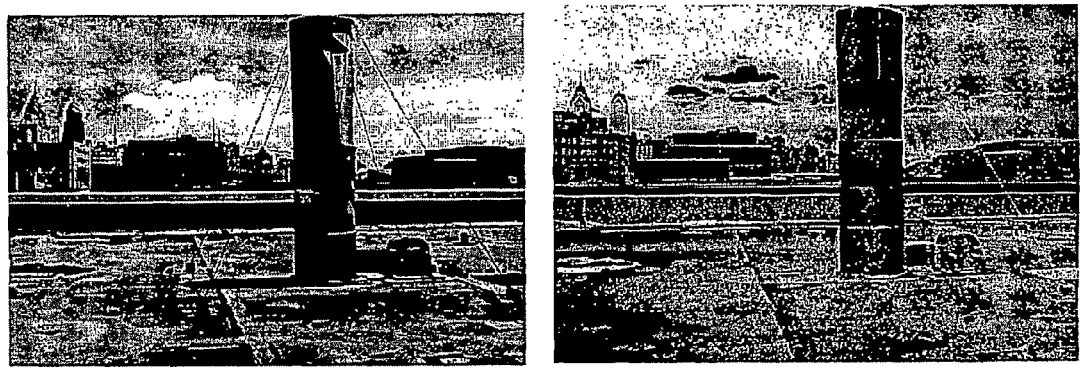
Figure 11:
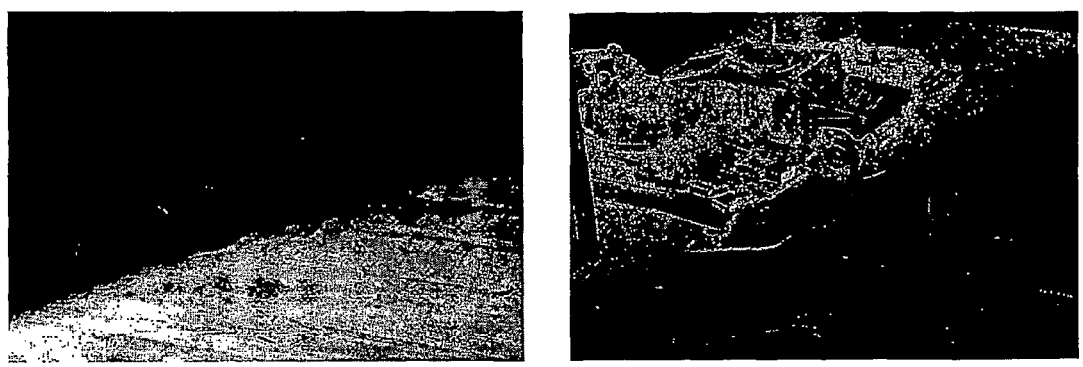
Figure 12:
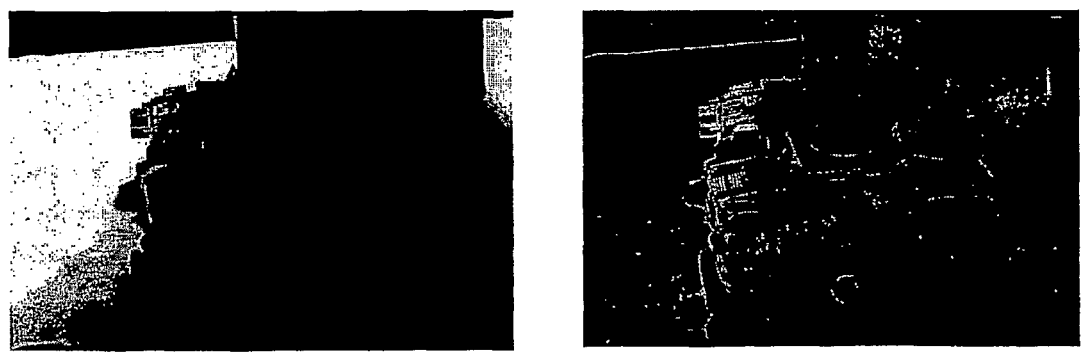
Figure 16:
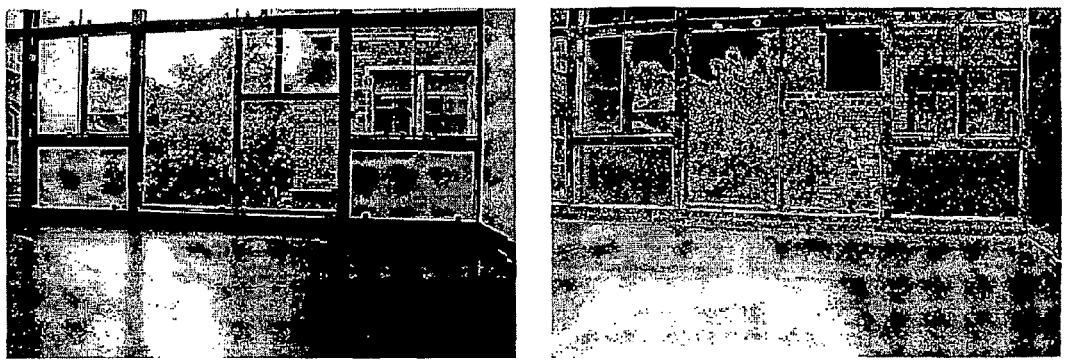

A sample analysis (FIG. 9, left side) shows segmentation results from region-growing analysis (starting with the entire image divided into 2×2 regions and with adjacent similar regions merging in each iteration of FIG. 8(c) into 21 regions). The side shadow area is cleanly separated from the image when 21 or more regions are segmented (FIG. 9, right side). It is noted that this pattern is only a portion of a larger shadow of the metal pillar cast by the source at the right, and that this larger shadow is partially obscured by both the small knob and the shadow of the small knob cast by the source opposing the camera.

FIGS. 10-16 illustrate additional pictures taken using the experimental apparatus described above. In each of the pictures in FIGS. 10-16, the left column shows the "intensity-only" images (equivalent to conventional images), while the right column shows some form of polarization information (e.g., degree of linear polarization) of each pixel taken using the techniques described herein. These images illustrate the ability of the techniques of the invention to separate and improve the contrast of objects within the cast shadows.

CONCLUSIONS

The processing of shadows in images presents many difficulties for scene segmentation, and all existing methods for analyzing shadows based on intensity-only information have limitations. Many methods are designed for specific applications like aerial photography or traffic monitoring so that the lighting condition is simplified or known a priori. Many applications using extant methods require a specific geometry of the illumination and camera, and/or very precise calibrations of the pixel sensitivity of the camera. The use of polarization in shadow analysis and segmentation appears to be robust and certainly provides new and useful information that may facilitate segmentation and detection of targets hidden in shadows and reveal new features of the scene and the sources that illuminate it. The polarization based shadow segmentation and target detection method of the invention does have its own limitations. For example, while the method of the invention is not strictly tied to a specific scene geometry, the method does not work when the scene signals happen to be unpolarized everywhere, a rare but possible scenario. Nonetheless, because signals extracted with Equation (2) are strongest when there is specular reflection, the use of the degree-of-polarization image for segmentation can be expected to give the best results when the source is opposite and directed toward the imaging system. A valuable feature of the method of the invention is that it can readily reveal the presence of multiple sources of widely varying "strength." As methods have already been developed for estimating the illumination directions of multiple light sources from information in the image, it can be anticipated that combining polarization analysis with these methods will produce valuable new tools for determining the direction of illumination sources. This use of polarization information in shadow detection, separation and contrast enhancement will also be further enhanced when it is combined with other well known cues like intensity, color, and geometry to achieve more accurate shadow segmentation and target detection and classification and give more detailed information on the origin of distinct shadow components. While the experiments noted above have based the shadow-segmentation solely on degree-of-polarization information, the additional cue provided by the orientation of the local polarization ellipse (θ in Equation (1)), which can also be used for image segmentation (in much the manner in which color is used), and it can also be anticipated that this will further enhance the method of the invention. (See J. S. Tyo, E. N. Jr. Pugh, and N. Engheta, "Colorimetric representation for use with polarization-difference imaging of objects in scattering media," J. Opt. Soc. Am. A 15, 367-374 (1998); K. M. Yemelyanov, M. A. Lo, E. N. Jr. Pugh, and N. Engheta, "Display of polarization information by coherently moving dots," Opt. Express 11, 1577-1584 (2003).) Moreover, as expected from the independence of polarization from the other physical attributes of light and demonstrated by the above experiments, information extracted by polarization about shadows is unique and in general cannot be extracted from other cues alone.

The method of the invention thus provides a novel method of shadow segmentation based on the local degree of polarization in images captured by a polarization-sensitive imaging system. It has been discovered that the polarization of light conveys distinct and valuable information about a scene that can be extracted at modest cost. Polarization has been used in many other vision tasks such as removing glare and target detection, but to the best of the inventor's knowledge has not previously been used to aid the segmentation of complex shadows in a scene. Polarization information enables a system to extract information about the complexities of multiple light sources and the overlapping shadows they create. Such shadows are very difficult even to detect in intensity-only images, and their extraction with polarization analysis provides a new means of identifying the direction and nature of light sources illuminating a scene.

Those skilled in the art will also appreciate that numerous other modifications to the invention are possible within the scope of the invention. Accordingly, the scope of the invention is not intended to be limited to the preferred embodiment described above, but only by the appended claims.

What is claimed:

1. A method of improving contrast to enable segmentation of shadows of an imaged scene, comprising the steps of:
    obtaining images of the scene from at least 3 different angles of orientation φ;
    calculating a measured intensity I at a specific image location or pixel as a function of the angle of orientation φ;
    recovering $I_U$, $I_A$, and θ for each pixel of the obtained images to provide $I_U$, $I_A$, and θ images, where $I_U$ is the 50% of the total intensity at each pixel in the scene, $I_A$ is 50% of the intensity difference between the maximum and minimum measured intensities of polarized light $((I_{max}-I_{min}/2))$ from each pixel as a function of the angle of orientation φ, and θ is the orientation angle of the major axis of a polarization ellipse;
    processing the $I_U$, $I_A$, and θ images to detect regions of the $I_U$, $I_A$, and θ images subject to different shadows.

2. A method as in claim 1, further comprising the steps of recovering and outputting a p image, where p is the degree of linear polarization defined as $p=I_A/I_U$.

3. A method as in claim 1, wherein the measured intensity I at a specific image location or pixel is calculated as a function of the angle of orientation φ of a polarization filter in accordance with the equation:

$I(\phi)=I_U+I_A \cos[2(\theta-\phi)]=I_U\{1+p\cos[2(\theta-\phi)]\}$, where $p=I_A/I_U$ defines the degree of linear polarization at the pixel.

4. A method as in claim 3, wherein a reference axis for the angles $\phi$ and $\theta$ is arbitrarily chosen.

5. A method as in claim 2, comprising the further step of providing contrast enhancement to at least one of the $I_U$, $I_A$, p, and $\theta$ images.

6. A method as in claim 5, wherein the contrast enhancement comprises linear stretch.

7. A method as in claim 1, wherein $\phi=0$, 45 and 90 degrees for the 3 different angles, respectively.

8. A method as in claim 7, wherein $I_U$, $I_A$, p, and $\theta$ are recovered for each pixel of the image in accordance with the equations:

$I_U=(I_0+I_{90})2$ $I_A=\sqrt{(I_{45}-I_U)^2+(I_{90}-I_U)^2}$ $\theta=\arctan[(I_{45}-I_U)/(I_{90}-I_U)]/2$, $p=I_A/I_U$, where indices 0, 45, and 90 indicate the orientation of a polarization in degrees when each specific image was taken.

9. A method as in claim 1, comprising the further step of processing the $I_U$, $I_A$, and $\theta$ images to identify or recognize a target within the image.

10. A system for improving contrast to enable segmentation of shadows of an imaged scene, comprising:
at least one polarization sensitive camera that obtains images of the scene from at least 3 different angles of orientation of a polarization filter of the at least one polarization sensitive camera; and
a processor programmed to calculate a measured intensity I at a specific image location or pixel as a function of an angel of orientation $\phi$ to recover $I_U$, $I_A$, and $\theta$ for each pixel of obtained images to provide $I_U$, $I_A$, and $\theta$ images, where $I_U$ is the 50% of the total intensity at each pixel in the scene, $I_A$ is 50% of the intensity difference between the maximum and minimum measured intensities of polarized light $((I_{max}-I_{min})/2)$ from each pixel as a function of the angle of orientation $\phi$, and $\theta$ is the orientation angle of the major axis of a polarization ellipse, and to detect regions of the $I_U$, $I_A$, and $\theta$ images subject to different shadows.

11. A system as in claim 10, further comprising an output device that displays the $I_U$, $I_A$, and $\theta$ images.

12. A system as in claim 10, wherein the processor further recovers and outputs for display a p image, where $p=I_A/I_U$.

13. A system as in claim 10, wherein the processor calculates the measured intensity I at a specific image location or pixel as a function of the angle of orientation $\phi$ of the polarization filter in accordance with the equation:

$I(\phi)=I_U+I_A\cos[2(\theta-\phi)]=I_U\{1+p\cos[2(\theta-\phi)]\}$ where $p=I_A/I_U$ defines the degree of linear polarization at the pixel.

14. A system as in claim 13, wherein a reference axis for the angles $\phi$ and $\theta$ is arbitrarily chosen.

15. A system as in claim 12, wherein the processor is further programmed to provide contrast enhancement to at least one of the $I_U$, $I_A$, and $\theta$ images.

16. A system as in claim 15, wherein the contrast enhancement is provided by a linear stretch algorithm.

17. A system as in claim 10, wherein $\phi=0$, 45, and 90 degrees for the 3 different angles, respectively.

18. A system as in claim 17, wherein the processor recovers $I_U$, $I_A$, p, and $\theta$ for each pixel of the image in accordance with the equations:

$I_U=(I_0+I_{90})/2$ $I_A=\sqrt{(I_{45}-I_U)^2+(I_{90}-I_U)^2}$ $\theta=\arctan[(I_{45}-I_U)/(I_{90}-I_U)]/2$, $p=I_A/I_U$, where indices 0, 45, and 90 indicate the orientation of the polarization filter in degrees when each specific image was taken.

19. A system as in claim 10, wherein said at least one polarization sensitive camera comprises a single camera and the polarization filter has at least three different polarization filter elements that are rotated in from of said single camera prior to obtaining each image of the scene.

20. A system as in claim 10, wherein said at least one polarization sensitive camera comprises three cameras that are synchronized to take images of the scene and three polarization filters, one for each camera, each polarization filter having a different angle of orientation $\phi$.

21. A system as in claim 10, wherein the processor further processes the $I_U$, $I_A$, and $\theta$ images to identify or recognize a target within the image.

* * * * *

UNITED STATES PATENT AND TRADEMARK OFFICE
CERTIFICATE OF CORRECTION

PATENT NO. : 8,396,319 B2  Page 1 of 1
APPLICATION NO. : 12/373969
DATED : March 12, 2013
INVENTOR(S) : Pugh, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this
First Day of September, 2015

Michelle K. Lee
*Director of the United States Patent and Trademark Office*